US008924593B2

(12) United States Patent
Ranney

(10) Patent No.: US 8,924,593 B2
(45) Date of Patent: Dec. 30, 2014

(54) APPARATUS AND METHOD FOR COMMUNICATION SERVICES NETWORK

(75) Inventor: Matthew J. Ranney, Oakland, CA (US)

(73) Assignee: Voxer IP LLC, San Francisco, CA (US)

( * ) Notice: Subject to any disclaimer, the term of this patent is extended or adjusted under 35 U.S.C. 154(b) by 354 days.

(21) Appl. No.: 13/084,238

(22) Filed: Apr. 11, 2011

(65) Prior Publication Data

US 2011/0252161 A1 Oct. 13, 2011

Related U.S. Application Data

(60) Provisional application No. 61/323,609, filed on Apr. 13, 2010.

(51) Int. Cl.

| | |
|---|---|
| ***G06F 15/16*** | (2006.01) |
| ***H04L 29/06*** | (2006.01) |
| ***H04L 12/58*** | (2006.01) |
| ***H04L 12/701*** | (2013.01) |
| *H04L 29/08* | (2006.01) |

(52) U.S. Cl.

CPC .......... *H04L 65/4092* (2013.01); *H04L 12/581* (2013.01); *H04L 45/00* (2013.01); *H04L 51/04* (2013.01); *H04L 65/80* (2013.01); *H04L 69/16* (2013.01); *H04L 69/14* (2013.01); *H04L 69/165* (2013.01); *H04L 65/4084* (2013.01); *H04L 67/24* (2013.01); *Y02B 60/33* (2013.01)

USPC ........... 709/248; 709/217; 709/223; 370/328; 370/352; 455/518; 707/624; 715/752

(58) Field of Classification Search

CPC ........ H04L 12/581; H04L 45/00; H04L 51/04

USPC .................. 709/248, 217, 223; 370/328, 352; 455/518; 707/624; 715/752

See application file for complete search history.

(56) References Cited

U.S. PATENT DOCUMENTS 5,651,054 A * 7/1997 Dunn et al. ................ 379/88.11
5,832,225 A * 11/1998 Hacherl et al. ................ 709/223

(Continued)

FOREIGN PATENT DOCUMENTS

WO WO 0211398 2/2002
WO WO 2009055220 4/2009
WO WO 2009055220 A2 * 4/2009 .............. H04L 12/58

OTHER PUBLICATIONS

International Search Report dated Jul. 6, 2011 from International Application No. PCT/US2011/031435.

(Continued)

*Primary Examiner* — Michael C Lai
(74) *Attorney, Agent, or Firm* — Beyer Law Group LLP

(57) ABSTRACT

A communication services network is described that enables client communication devices to synchronously or asynchronously communicate with one another or with legacy communication devices through a gateway in either (i) a real-time mode or (ii) a time-shifted mode and (iii) to seamlessly transition between the two modes. As the media of a message is either created or retrieved from memory, the sending client device progressively transmits the media over the network. The network progressively routes the media as it is transmitted to the recipient client device or gateway, which progressively stores the media as it is received. With progressive storage, the recipient has the option of rendering the media as it is received in the real-time mode, rendering the media out of storage in the time-shifted mode, or seamlessly transitioning between the two modes. In addition, users may communicate with each other "live", similar to a conventional full duplex telephone call, when messages are synchronously transmitted and rendered in real-time with respect to one another. Alternatively, users may communicate with each other asynchronously by sending messages back and forth at discrete times, or by time-shifting the review of received messages.

27 Claims, 10 Drawing Sheets

(56) References Cited

U.S. PATENT DOCUMENTS

| | | | | |
|---|---|---|---|---|
| 8,166,118 | B1 * | 4/2012 | Borghetti | 709/206 |
| 2002/0065823 | A1 * | 5/2002 | Boulter et al. | 707/7 |
| 2002/0073205 | A1 * | 6/2002 | Mostafa | 709/227 |
| 2006/0242037 | A1 * | 10/2006 | Tanimura et al. | 705/35 |
| 2006/0248149 | A1 * | 11/2006 | Kraft et al. | 709/206 |
| 2007/0106783 | A1 * | 5/2007 | Pearson et al. | 709/224 |
| 2007/0123284 | A1 * | 5/2007 | Schliwa-Bertling et al. | 455/518 |
| 2007/0177583 | A1 * | 8/2007 | Vernal et al. | 370/352 |
| 2007/0266108 | A1 * | 11/2007 | Patterson et al. | 709/217 |
| 2008/0263064 | A1 * | 10/2008 | Choi | 707/100 |
| 2010/0082540 | A1 * | 4/2010 | Isaacson et al. | 707/624 |
| 2011/0041006 | A1 * | 2/2011 | Fowler | 714/10 |
| 2011/0185286 | A1 * | 7/2011 | Moyers et al. | 715/752 |
| 2012/0002601 | A1 * | 1/2012 | Underwood et al. | 370/328 |

OTHER PUBLICATIONS

Written Opinion dated Jul. 6, 2011 from International Application No. PCT/US2011/PCT/US2011/031435.

Written Opinion of the International Preliminary Examining Authority from PCT/US2011/031435 mailed Jul. 9, 2012.

International Preliminary Report on Patentability from PCT/US2011/031435 mailed Sep. 5, 2012.

U.S. Appl. No. 60/999,619, filed Oct. 19, 2007.

* cited by examiner

APPARATUS AND METHOD FOR COMMUNICATION SERVICES NETWORK

CROSS-REFERENCE TO RELATED APPLICATIONS

This application claims the benefit of priority to U.S. Provisional Application Ser. No. 61/323,609 entitled "Communication Services Network and Client Enabled Communication Devices," filed Apr. 13, 2010, which is incorporated by reference herein in its entirety for all purposes.

BACKGROUND

1. Field of the Invention

This invention relates to communications, and more particularly, to a communication services network that enables client communication devices to synchronously or asynchronously communicate with others in either (i) a real-time mode or (ii) a time-shifted mode and (iii) and to seamlessly transition between the two modes.

2. Description of Related Art

A client application that enables client communication devices to synchronously or asynchronously communicate with others in either (i) a real-time mode or (ii) a time-shifted mode and (iii) and to seamlessly transition between the two modes is known. See for example commonly assigned co-pending application Ser. No. 12/020,400 (U.S. Publication No. 2009/0003558), Ser. No. 12/253,833 (U.S. Publication No. 2009/0168760), Ser. No. 12/253,820 (U.S. Publication No. 2009/0168759) and Ser. No. 12/253,833 (U.S. Publication No. 2009/0168760), each of which are incorporated by reference herein for all purposes.

The client communication devices as described in the aforementioned applications are programmable devices, such as mobile and desktop computers or wired or wireless telephones, capable of running the communication application. When executing the application, the client communication devices transmit media in the context of messages. The messages may be sent and reviewed between devices either synchronously or asynchronously. With the former, created messages are transmitted and received messages are rendered at approximately the same time, creating a user experience similar to a conventional, full duplex, telephone conversation. On the other hand, when messages are sent back and forth at discrete times, or received messages are time-shifted when reviewed, then the user experience is similar to an asynchronous messaging system.

With the communication devices running the aforementioned application, media is (i) progressively stored as a message is created and transmitted and (ii) progressively stored as a message is received over the communication network. When in the real-time mode, the media is rendered as the message is progressively received over the network. In the time-shifted mode, the media of the message is retrieved and progressively rendered from storage. In addition, rendering options on the communication device allow the seamless transition, from the perspective of the user, between the rendering of the media of the message from storage in the time-shifted mode to as the media is received over the network in the real-time mode, or vice versa.

One known communication network is the Public Switched Telephone Network (PSTN) used for conventional phone calls. With telephone calls over the PSTN, a circuit connection is required before any communication may take place. In addition, phone calls are "live" only. Asynchronous communication is not possible with conventional telephone calls.

Voice Over Internet Protocol or VoIP allows the transmission of live voice over packet-based networks, such as the Internet. VoIP calls, however, require the use of the Session Internet Protocol (SIP) to set up a "connection" between the participants of the call before communication may take place. Once the call is complete, SIP is used to tear down the connection. VoIP calls, like conventional calls over the PSTN, are live only.

Voice mail systems, used in cooperation with both PSTN and VoIP calls, are also well known. Voice mail systems, regardless if based on a "stand-alone" recording machine or a voice mail server, are separate and distinct from either the PSTN or VoIP networks. When a PSTN or VoIP call is placed, and the recipient does not answer, the calling party is "rolled over" to either a recording machine or a voice mail server. In either case, a "live" connection must be established between the calling party and the voice mail system before a message can be left.

Push To Talk (PTT) communication systems are half-duplex only. Before a PTT message can be sent, a channel must first be established over the network between the sender and the receiver. Once the channel is defined, a one-way message may be sent from the sender to the recipient. Since PTT networks are half-duplex, only one person is allowed to speak at a time. If two or more people attempt to speak at the same time, one channel will "step" on the other(s), preventing multiple transmissions concurrently.

Email and the DNS infrastructure is a store and forward communication system. Emails must be composed in full before they are transmitted. Once transmitted, the email is typically received in full at each network hop before being forwarded to the next hop along the delivery path to the recipient. Due to the store and forward nature of the email infrastructure, emails are typically text based. While it is common to transmit an email with attached files containing time-based media, such as a voice or video clip, it is not possible for emails to be used for the transmission of time-based media as the media is created. Consequently, live or synchronous communication is not possible with email.

Text based messaging systems are also known. Like emails, these systems require the message to be complete before the message is transmitted. Live and synchronous communication is therefore not possible with these types of systems.

Video chat systems are also known, such as for example iChat offered by Apple of Cupertino, Calif. With iChat, participants may engage in live voice and video chat sessions. iChat and similar live messaging systems rely on SIP to set up and tear down the connection between the parties before any communication can take place. In addition, voice and video chat systems are also live only and are incapable of supporting asynchronous communication or messaging.

Asynchronous voice messaging systems are also known. See for example U.S. Publication No. 2006/0248149 issued to Kraft et al. With asynchronous voice messaging systems, a message is transmitted only after it has been created in full or rendered only after it has been received in full. Asynchronous voice messaging systems, such as Kraft, are incapable of transmitting or rendering messages in real-time. As a consequence, these systems are incapable of supporting synchronous or real-time communication.

None of the aforementioned networks or services enable client communication devices to synchronously or asynchronously communicate with others in either (i) a real-time mode or (ii) a time-shifted mode and (iii) and to seamlessly transition between the two modes.

SUMMARY OF THE INVENTION

A communication services network is described that includes a server with a header store, a body store and a router. During operation, the server is configured to progressively receive time-based media of a message intended for a recipient. The message includes a message header and a message body containing the time-based media. As the message is received, the message header is stored in the header store, while the time-based media of the message is progressively stored in the body store. As the time-based media is progressively received and stored, the router progressively routes the time-based media to the recipient. With the progressive delivery of the media of message over the communication services network, plus the local storage of the media of messages, client and legacy devices are able to communicate with each other synchronously or asynchronously in either (i) a real-time mode or (ii) a time-shifted mode and (iii) and to seamlessly transition between the two modes.

The transmission, routing and receipt of messages across the communication services network in real-time is accomplished by separating message headers from message bodies. By separating the two, the header of a message may be transmitted ahead of and separate from the message body. As the header is transmitted, a delivery path is discovered over the network to the recipient, ahead of the message body. By separating the message header from the body, the media associated with the message may be (i) progressively forwarded to the recipient(s) as it is created or retrieved from storage as soon as the next hop to the recipient becomes known, (ii) possibly before the complete delivery rout to the recipient is fully known and/or (iii) possibly before the media of the message is complete. As a result, the time-based media of messages may be transmitted as the media is created or retrieved from memory, allowing the recipient to render the media of the incoming message in real-time as the media is either created "live" or transmitted out of storage.

In non-exclusive embodiments, the communication services network may include one or more server clusters, each including one or more of the routers, one or more of the header stores and one or more of the body stores, all connected in a full mesh. The communication services network may further be scaled as needed by adding or deleting (i) server clusters and/or (ii) number of routers, header stores and body stores per server cluster. In addition, sharding and replication mechanisms may be implemented for scaling, redundancy and failover.

The server clusters, client and legacy devices communicate with one another over the communication services network using individual message units. Each message includes a transport header field, an encapsulation format field for storing various objects, such as recipient address information, presence status, and other meta data, and possibly a media field for messages containing media. The media field is dynamic, meaning it is not fixed in duration or size. Rather, as media associated with a message is created or retrieved from memory, the media is dynamically added to the media field. Individual messages are transported across the network using an encapsulation format over a transport header protocol. In variations of this embodiment, the encapsulation format may include JSON, XML, msgpacck, or any other encapsulation format. Similarly, any transport header protocol may be used, such as but not limited to Hypertext Transfer Protocol (HTTP), SMTP, or SIP.

BRIEF DESCRIPTION OF THE DRAWINGS

The invention may best be understood to the following written description with reference to the accompanying drawings, which illustrate non-exclusive embodiments in accordance with the principles of the present invention.

It should be noted that like reference numbers refer to like elements in the figures.

The above-listed figures are illustrative and are provided as merely examples of embodiments for implementing the various principles and features of the present invention. It should be understood that the features and principles of the present invention may be implemented in a variety of other embodiments and the specific embodiments as illustrated in the Figures should in no way be construed as limiting the scope of the invention.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

The term "media" is as used herein is intended to be broadly construed to mean virtually any type of media, such as but not limited to, voice, video, text, still pictures, sensor data, GPS data, or just about any other type of media, data or information. Time-based media is intended to mean any type of media that changes over time, such as voice or video. By way of comparison, media such as photographs or text, is not time-based since this type of media does not change over time.

As used herein, the term "conversation" is broadly construed. A conversation is intended to mean two or more messages, regardless if they are tied together by a common attribute or not. Common attributes that may be used for a conversation include, but are not limited to, a subject matter or topic, by name, by participants, by a user group, or some other defined criteria. In addition, conversations may include multiple types of media. For example, a conversation string may contain messages containing voice, video, text, pictures, or other media types. In addition, the terms conversation and chat are intended to have virtually the same meaning and may be used interchangeably.

The term persistent storage is intended to be broadly construed and mean the storage of media and meta data from indefinitely to any period of time longer than transient storage needed to either transmit or render media in real-time.

A. System Architecture

Figure 1A:
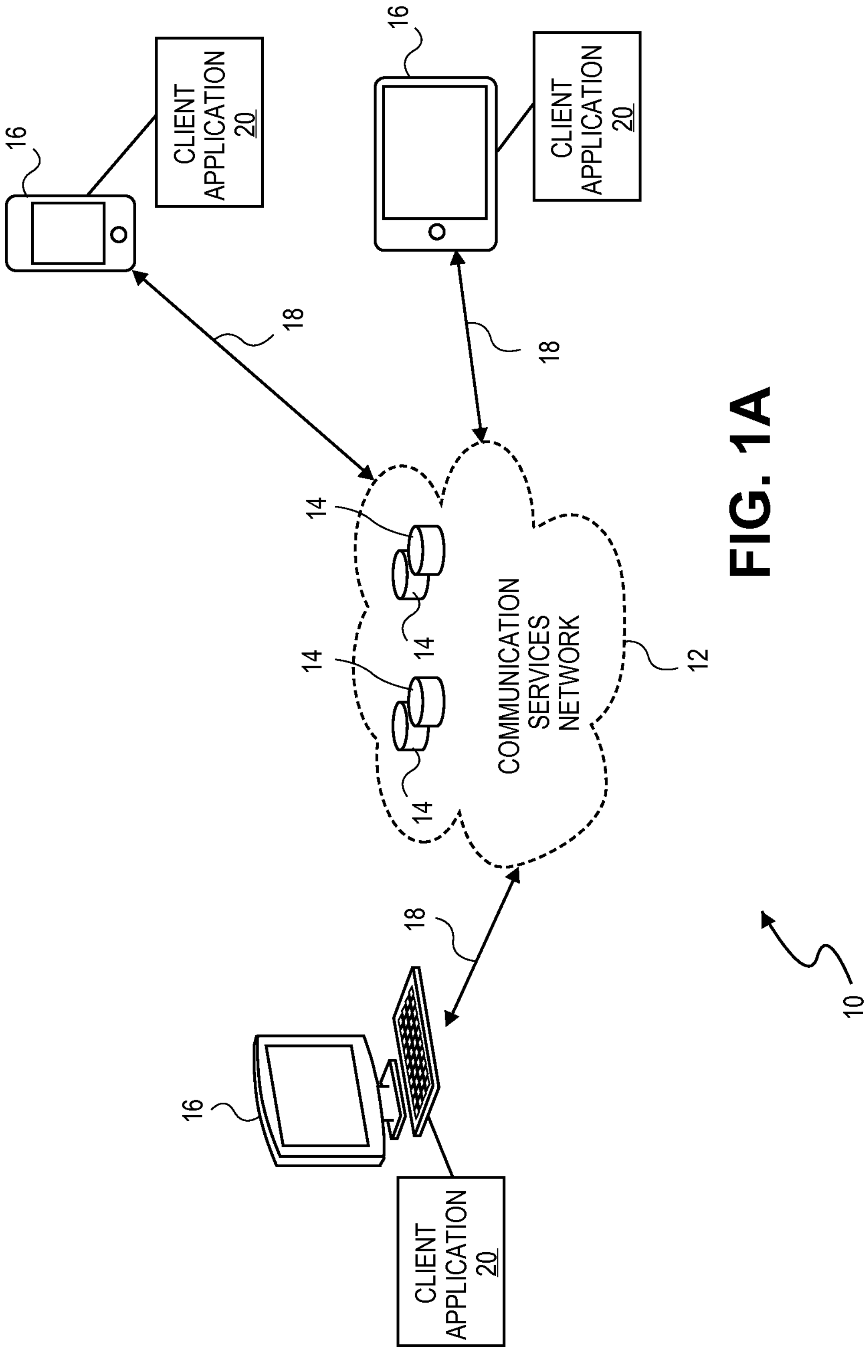
FIG. 1A is a block diagram of a communication services network in a communication system in accordance with the principles of the present invention.

Referring to FIG. 1A, a block diagram is shown of a communication system 10 used in cooperation with a communication services network 12 of the present invention. The communication services network 12 includes one or more server clusters 14. One or more client communication devices 16 are coupled to the communication services network 12 through an Internet protocol (IP) based network connection 18.

In various embodiments, the communication services network 12 is either heterogeneous or homogeneous. The devices 16 may be any type of communication device, such as telephones, including land-line, cellular or mobile phones, any type of computer, including desktop, laptop, notebook, netbook, or tablet computer, or any type of radio based communication device, such as a PTT radio or satellite based communication device. Depending on the type of communication device 16, the connection 18 may be wired or wireless and is established over one or more different types of communication networks (not illustrated), such as the Public Switched Telephone Network (PSTN), a cellular network based on CDMA or GSM for example, a push To Talk (PTT) network, the Internet, an intranet or private communication network, a WiFi network, a tactical radio network, or any other communication network, or any combination thereof.

The client communication devices 16 each run a client application 20, as described in the commonly assigned, co-pending, patent applications listed in the Background herein. As noted above, the client application 20 is essentially a messaging application that operates in a time-shifted mode, a real-time mode, and provides the ability to seamlessly transition between the two modes. With the client application 20, both inbound and outgoing media is persistently and progressively stored on the client device 16 as the media of messages is either (i) progressively received over the network connection 18 or (ii) created on a communication device 16 and progressively transmitted over the network connection 18. In addition, the client application 20 may be capable of supporting multiple types of media, including but not limited to, voice, video, text, still pictures, sensor data, GPS data, or just about any other type of media, data or information. For more details on the client application 20, see the above-listed co-pending patent applications, each incorporated herein for all purposes.

Figure 1B:
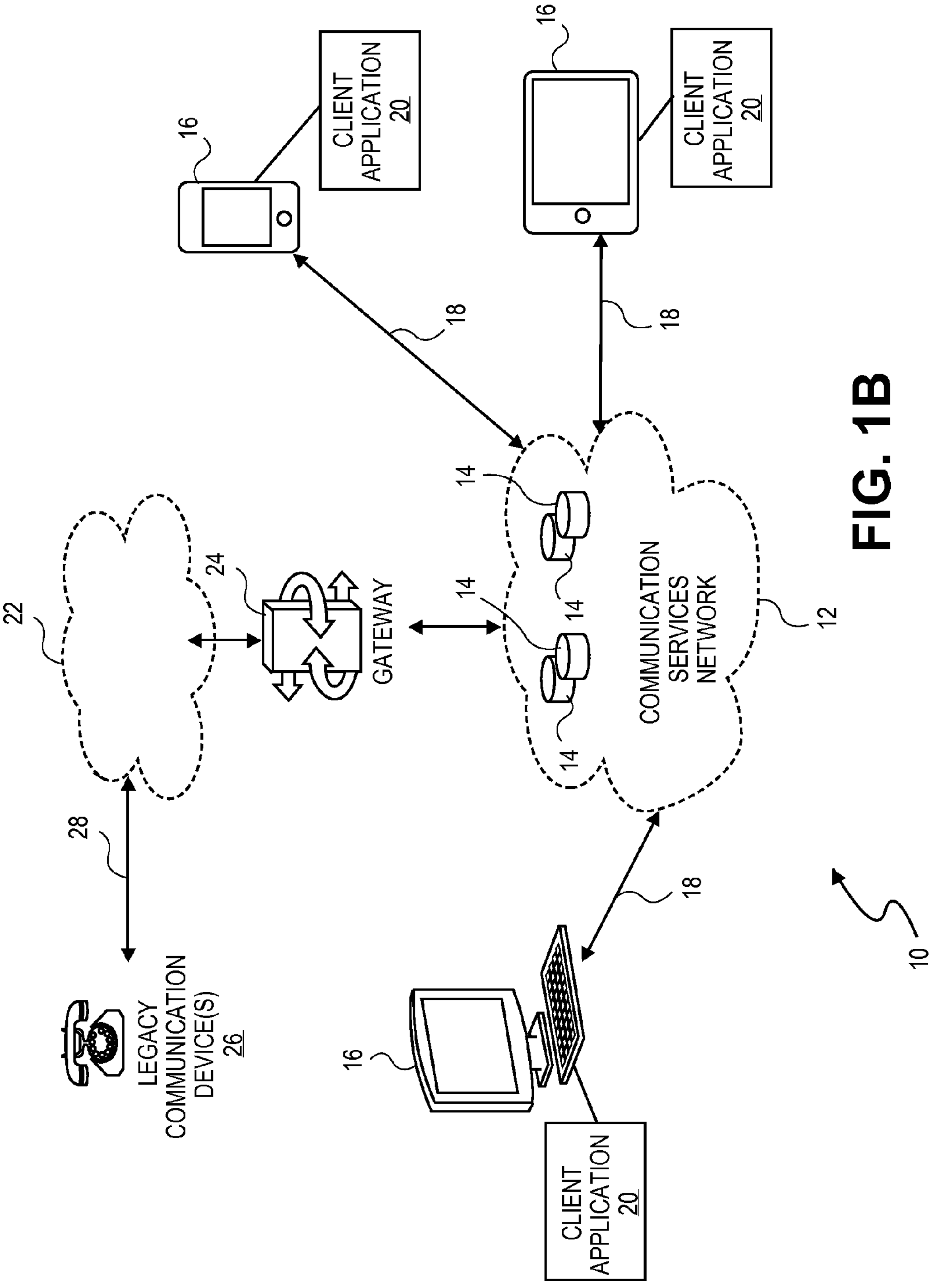
FIG. 1B is a block diagram of the communication services network in communication with legacy communication systems in accordance with another embodiment of the invention.

Referring to FIG. 1B, a block diagram is shown of another non-exclusive embodiment of the communication services network 12 of the present invention in communication with legacy communication network(s) 22. With this embodiment, a gateway 24 straddles the networks 12 and 22 and enables legacy devices 26 and client 20 enabled communication devices 16 to communicate with one another. The gateway 24 includes, as is well known in the art, a protocol translator responsible for translating the protocol used within the communication services network 12 to that used on the legacy network(s) 22 and vice versa. In addition, the gateway 24 also performs impedance matching, signal translators, fault isolators, and any other task necessary to facilitate communication between the two networks 12 and 22.

In various embodiments, the legacy network(s) 22 may include a circuit switched network, such as the Public Switched Telephone Network (PSTN), a cellular or mobile phone network, a Push to Talk (PTT) network, a WiFi network, a packet-based network such as the Internet, or any combination thereof. One or more legacy communication devices 26 may be connected to the network(s) 22 through either wired or wireless connection(s) 28, as is well known in the art. In various embodiments, the legacy device(s) 26 may include conventional PSTN or VoIP telephones, mobile or cellular phones, PTT radios, satellite phones, desktop or mobile computers, or any combination thereof.

In an optional embodiment, the gateway 24 may also function as a gateway client, persistently storing inbound and outgoing media at the gateway on behalf of legacy devices 26. With the persistent storage of media on the gateway 24, a user of a legacy device 26 may experience much of the functionality of a device 16 running the application 20 through the gateway 16. By using commands generated on the legacy device 26, such as DTMF signals or voice activated commands, the rendering of media can be controlled using some or all of the rendering options provided by the client application 20, thereby controlling the rendering of media in either the time-shifted mode, the real-time mode, and the ability to seamlessly transition between the two modes. For more details on the implementation of a gateway client, see commonly assigned U.S. application Ser. No. 12/206,537 filed Sep. 8, 2008 (now U.S. Publication No. 2009/0103693), incorporated herein by reference for all purposes.

For the sake of simplicity, only three client communication devices 16 are illustrated in FIGS. 1A and 1B and one legacy device 26 in FIG. 1B. It should be understood that a large number of client communication devices 16 and/or legacy devices 26 can communicate over the communication services network 12 at any point in time.

B. Communication Services Network

Figure 2:
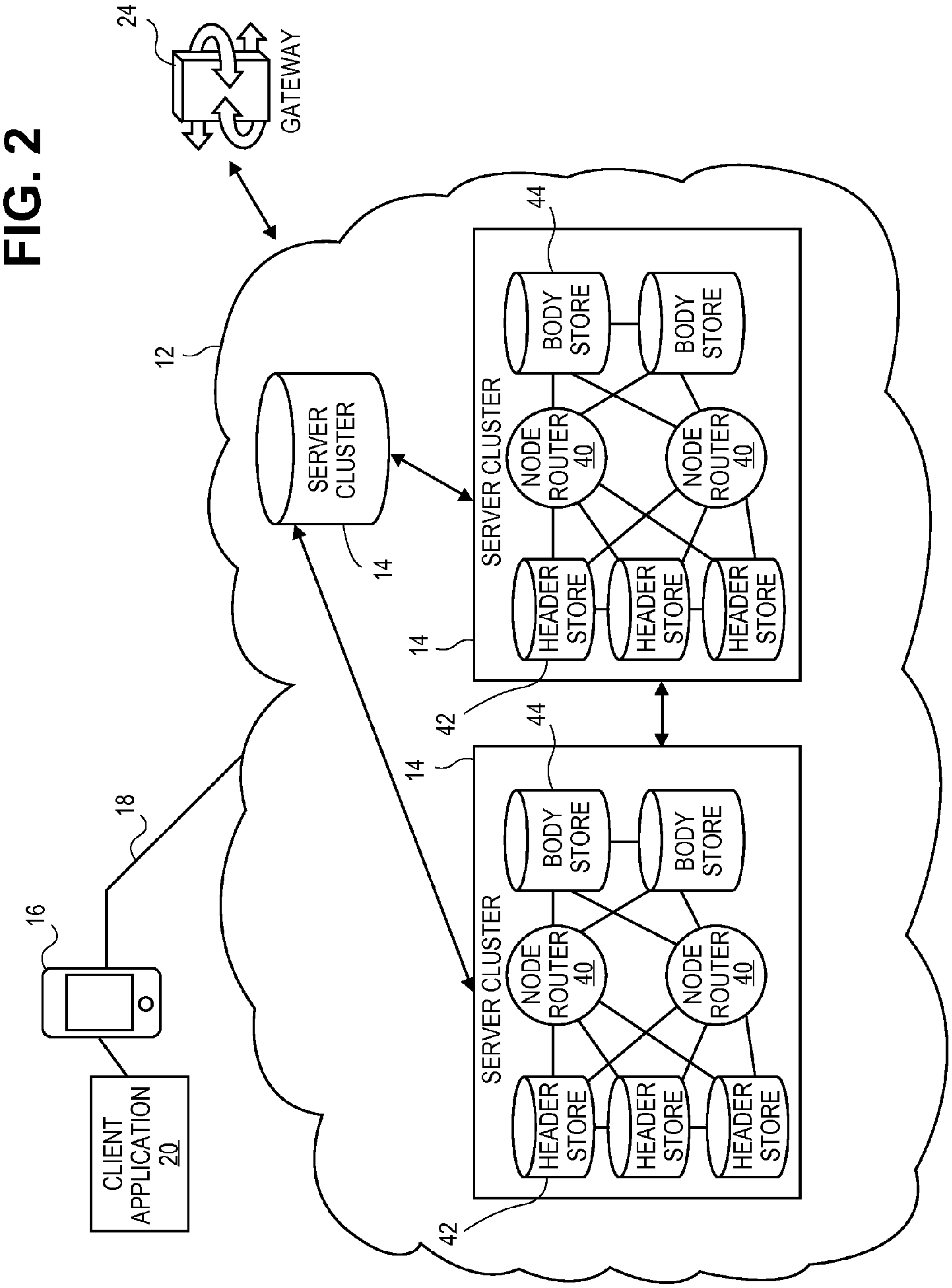
FIG. 2 is a block diagram of one possible example of the communication services network in accordance with the principles of the present invention.

Referring to FIG. 2, a block diagram of one possible implementation of the communication services network 12 in accordance with the principles of the present invention is shown. The network 12 includes one or more server clusters 14. Each of the server clusters 14 includes a full mesh of one or more router(s) 40, one or more header store(s) 42, and one or more body store(s) 44.

The routers 40 communicate with other routers 40, with header stores 42 for read and/or write operations, and with body stores 44 for read/write operations in the same or other server clusters 14. Routers 40 are further responsible for updating routing tables and maintaining the presence status information of users of client 20 enabled communication devices 16 and/or legacy devices 26.

Routers 40 also perform a number of security functions, including authentication, encryption, and digital signatures. With authentication, the identity of each user of a communication device 16 and/or legacy devices 26 is associated with a digital signature. Each bona fide user is provided a username and password. When a user logs onto the network 12, a router 40 authenticates the user based on the entered username and password as is well known in the art.

The body stores 44 are provided to persistently store the media of messages sent back and forth between communication devices 16 and/or legacy devices 26. The media of messages is typically indexed so that it may be retrieved from the body stores 44 in time-index order.

The body stores 44 also act as an archive for media no longer persistently stored on communication devices 16 and possibly a gateway client 24 on behalf of a legacy device 26. Since client devices 16 typically have limited data storage capabilities, media of messages may eventually be replaced on a device 16 with new media. In the event the user of the device 16 would like to review replaced media, the media in question may be retrieved from the appropriate body store 44 and transmitted to the device 16 of the user for review.

Each communication device 16 connects to the communication services network 12 through a router 40 of a server cluster 14. The client application 20 running on a client device 16 maintains the IP address of one or more routers 40, allowing the device 16 to connect to the network 12. Using DNS naming and load balancers, a device 16 running client application 20 connects to the appropriate router 40 capable of providing the services provided by the network 12. In the event a device 16 looses connectivity, for example when a mobile phone roams out of range of one cell tower and into the range of the next, the connection process with the appropriate router 40 is repeated. The appropriate router 40 may be a different or the same router 40. Depending on the robustness of the connectivity points where the user is roaming, the process of reconnecting to the network 12 will typically be seamless. In the event the user is disconnected from the network 12, for example when the connection 18 goes down or when roaming out of network range or into locations where connectivity is sparse, then the user may be negatively impacted by delays in the transmission and/or receipt of messages.

On the services network 12, each of the server clusters 14 subscribe to all of the header and body media for a given user. As a result, if the server cluster 14 that holds the header and/or body information for a user becomes unavailable, a router 40 of another server cluster 14 may be able to locate another server cluster 14 to obtain the data. In other embodiments, users may subscribe based on the domain of user(s), defined sets of users, and/or a time range.

It is noted that the specific configuration of server clusters 14, routers 40, header stores 42, or body stores 44 as provided in FIG. 2 is for illustration purposes only. In no way should this particular configuration be construed as limiting. As described in greater detail below, the server clusters 14 and the various components of each may configured and scaled in a variety of ways.

C. Messages and Transport Formats

Devices 16 running client application 20 and/or legacy devices 26 through gateway clients 24 communicate with one another over the communication services network 12 using individual message units, referred to herein as "Vox messages". By sending Vox messages back and forth over the communication services network 12, the users of the devices 16 and/or legacy device 26 through gateway 24 communicate with one another in either the real-time or time-shifted modes, and with the ability to seamlessly transition between the two modes.

In addition, the users may communicate with each other synchronously, like a conventional telephone call, when sending Vox messages back and forth at substantially the same time with respect to one another. Alternatively, users may communicate with each other asynchronously by sending Vox messages at discrete times with respect to one another, or by time-shifting the review of received Vox messages.

There are two types of Vox messages, including (i) messages that do not contain media and (ii) messages that do contain media. Vox messages that do not contain media are generally used for meta data, such as media headers and descriptors, contacts information, presence status information, etc. The Vox messages that contain media are used for the transport of media, such as voice, video, photos or pictures, GPS data, etc.

Individual Vox messages are transported across the network 12 using an encapsulation format over a transport header protocol. In non-exclusive embodiments, the encapsulation format may include JSON, XML, msgpack (which is short for "MessagePack" which refers to a well known serialization format that enables the exchange of data among multiple encapsulation formats and languages, such as JSON), or any other encapsulation format. Similarly, any transport header protocol may be used, such as but not limited to Hypertext Transfer Protocol (HTTP), SMTP, or SIP.

Figure 3A:
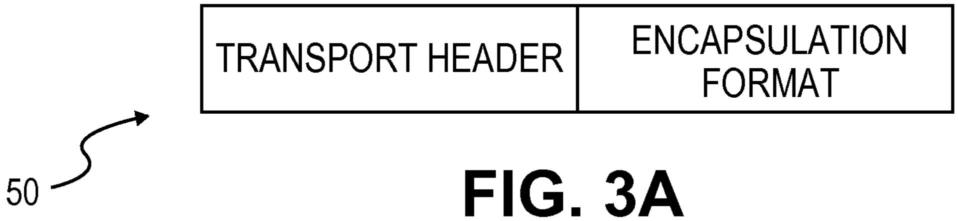
FIGS. 3A through 3D illustrate possible examples for message protocol structures used over the communication services network in accordance with the principles of the present invention.
Figure 3B:
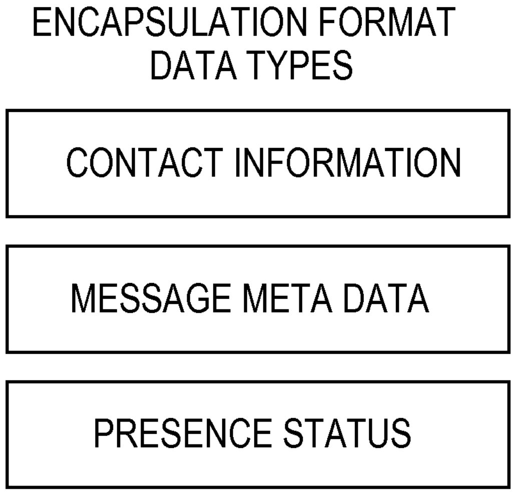

Referring to FIG. 3A, the protocol structure of a Vox message 50 that does not contain media is illustrated. The Vox message 50 includes a transport header field and an encapsulation format field for storing various objects, such as contact information, presence status information for the user of a device 16 or legacy device 26, or message meta data, as illustrated in FIG. 3B. It should be understood that the list of objects provided in FIG. 3B is not exhaustive. Other objects, such as but not limited to, user location update information, user log-in information, information pertaining to the authentication of users, statistical information, or any machine-to-machine type message, may also be encapsulated in the encapsulation format field of Vox messages 50.

Contact information includes the name, address (e.g., telephone number, email address, or some other unique identifier), or other attributes for each of the contacts in the contact list of a user of a device 16 running client application 20 or legacy device 26. The contact information is used to create contact lists, and to direct messages to intended recipients using the addressing information associated with the individual contacts in the contact list.

Meta data define the attributes for Vox messages 50. These attributes include a message identifier or ID, the identification of the message originator, a recipient list, and a message subject. The meta data of messages is useful for associating the individual messages of a conversation or chat. By associating the messages having one or more common attributes together, conversations or chats can be constructed. For example, conversions may be defined by attributes such as a conversation name, a topic, parties or a user group, or any other attribute.

Vox message identifier information may also be used for a variety of other reasons, including, but not limited to, building contact lists and/or associating media with messages. The set of attributes for a given message may be extensible, and not all attributes necessarily need to be supported by all instantiations of the client application 20.

Presence status information is used to identify the users that are currently connected to and authenticated by the network 12. Presence status information is also used to determine if an authenticated user is reviewing a message in the real-time mode or not.

Figure 3C:

Referring to FIG. 3C, the protocol structure of a Vox message 52 that contains media is illustrated. The Vox message 52 is essentially the same as a non-media message 50, except it includes a media field. The media field is dynamic, meaning it is not a fixed duration or size. Rather, as media associated with a Vox message 52 is created or retrieved from storage, the media is dynamically added to the media field. The media field is capable of containing both time-based and non time-based media, such as, but not limited to, voice, video, text, sensor data, still pictures or photos, GPS data, or just about any other type of media, or a combination thereof.

Figure 3D:
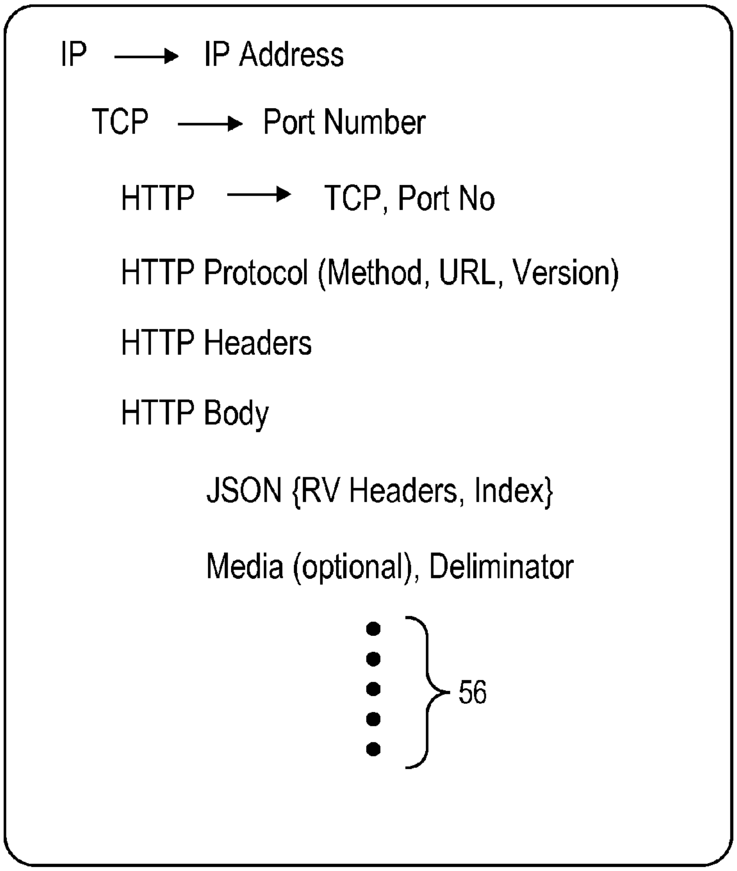

Referring to FIG. 3D, an exemplary HTTP protocol stack 54 with a Vox message 52 embedded therein is illustrated. In this example, the HTTP protocol stack 54 is transported across the network 12 using IP and TCP. The HTTP protocol stack 54 includes transport header information (e.g., TCP and port number) and other HTTP protocol information (e.g., method, URL, and version), and HTTP headers. The encapsulation format portion of the HTTP stack includes the HTTP body as well as other format information (e.g., JSON, Vox data types (e.g., contact information, meta data, presence status). Finally, the media portion of the HTTP stack includes the media of a Vox message 52, as denoted in the diagram by bracket 56. A deliminator, such as the Carriage Return Line Field (CRLF), ASCII null may be used. If an HTTP protocol stack includes a Vox message 50 (without media), then media is not included in the stack 54.

In one non-exclusive embodiment, the Vox messages 50 and 52 are sent back and forth between communication devices 16 and/or a gateway client 24 over the network 12 using the HTTP protocol. With this embodiment, Vox messages 50 not including media are sent using JSON strings terminated by a CRLF over HTTP. Vox messages 52 with media use a slightly different format. When sending a Vox message 52 from a device 16 or gateway client 26, the format is: JSON+CRLF+media bytes. When retrieving the media of a message from a client device 16 or gateway client 26, the format is: media bytes, because the JSON is retrieved through one of the JSON+CRLF methods. Consequently, a generalization of using JSON as the encapsulation format may include a mix of the following:

JSON+CRLF, or "serialization format"+"deliminator";
JSON+CRLF sequence;
JSON+CRLF sequence on an HTTP stream;
JSON+CRLF+media; and
Media.

Transactions between devices 16, gateway 26, and server clusters 14 on the network 12 are bounded by the standard HTTP request-response protocol. For example, a device 16 may make the request for new messages. In reply, the appropriate server cluster 14 may respond with the new messages in the JSON+CRLF format sequence. In an alternative example, the device 16 may make the request for the media of a particular Vox message X, In response, the appropriate server cluster 14 replies with the requested Vox message X.

As noted above, the encapsulation format could be JSON, XML, msgpack, or other encapsulation formats. The examples provided above for JSON therefore should not be construed as limiting in any manner. Rather analogous formats using the other encapsulation formats could be used. The deliminator can be CRLF, NULL, a carriage return, or any other terminator may be used. Although a deliminator is not strictly required, it makes the parsing of individual Vox messages easier. It should be noted that the specific transport headers and encapsulation formats as listed herein are merely exemplary. Any transport header or encapsulation format may be used, including new protocols developed in the future, or those currently known, but not listed herein.

D. Operation

The applicants make use of the HTTP protocol so that a single HTTP message may be used for the real-time transmission of (i) live media as the media is created or (ii) previously stored media as the media is retrieved from storage. This feature is accomplished by separating the header from the body of HTTP messages. By separating the two, the body of an HTTP message no longer has to be attached to and transmitted together with the header. Rather, the header of an HTTP message may be transmitted immediately as the header information is defined, ahead of the body of the message. As a result, time-based media may be transmitted, either live or from storage, along a delivery path discovered using header information contained in the earlier sent HTTP header.

In one non-exclusive embodiment, the late binding of "cut through" HTTP messages are used to support real-time communication. With the late-binding of cut-through messages, the routing of an HTTP message starts as soon as the HTTP header information is defined at a client application 20 enabled device 16 or gateway 24 on behalf of a legacy device 26. By initiating the routing of the message immediately after the header (e.g. a unique identifier associated with a recipient) information is defined, the media associated with the message may be (i) progressively forwarded to the recipient(s) as it is created or retrieved from storage as soon as the next hop to the recipient becomes known, (ii) possibly before the complete delivery rout to the recipient is fully known and/or (iii) possibly before the media of the message is complete. As a result, the time-based media of Vox messages may be transmitted as the media is being created or retrieved from memory, allowing the recipient to render the media of the incoming HTTP message in real-time as the media is either created "live" or transmitted out of storage.

For more details on the addressing of Vox messages using email addresses and other identifiers, "cut-through" messages, and the late binding of messages, see co-pending commonly assigned U.S. application Ser. No. 12/419,861 (U.S. Publication No. 2010/0198922), Ser. No. 12/419,889 (U.S. Publication No. 2010/0198923), Ser. No. 12/419,914 (U.S. Publication No. 2010/0198988), Ser. No. 12/552,979 (U.S. Publication No. 2010/0198925), Ser. No. 12/552,980 (U.S. Publication No. 2010/0199133), and Ser. No. 12/857,454 (U.S. Publication No. 2010/0312844), each incorporated by reference herein for all purposes.

The separation of HTTP headers and bodies facilitates the persistent storage of the headers and bodies of Vox messages 50, 52 in the header stores 42 and body stores 44 of server clusters 14 respectively. By maintaining separate header stores 42 and body stores 44, the Vox header information of messages may be used immediately to discover a rout to the recipient, as soon as the header information is received. The path to the recipient can therefore be discovered without first waiting for the associated body of the Vox message to arrive in full at each hop.

The storage of media of Vox messages in separate body stores 44 also allows for the different delivery protocols for forwarding the media of a message to the recipient, depending on the presence status of the recipient and/or conditions on the network. For example, if one or more recipients is reviewing in real-time, and conditions on the network are poor, then a transport protocol optimized for timely (i.e., real-time) delivery, such as the User Datagram Protocol (UDP), may be used. Alternatively, a transport protocol optimized for efficient delivery of messages, such as the Transmission Control Protocol (TCP), may be used when (i) all the recipients are not reviewing in real-time or (ii) at least one recipient is reviewing in real-time, but conditions on the network are good enough to support the transmission without having to resort to using a protocol optimized for timely delivery. For more details using either a loss tolerant or a network efficient protocol, see co-pending and commonly assigned U.S. application Ser. Nos. 12/792,660 and 12/792,680, both incorporated by reference herein. In an alternative embodiment, a Cooperative Transmission Protocol (CTP) may be used, as described in commonly assigned, co-pending U.S. application Ser. No. 12/192,890 (U.S. Publication Number 2009/010321), also incorporated by reference.

Figure 4A:
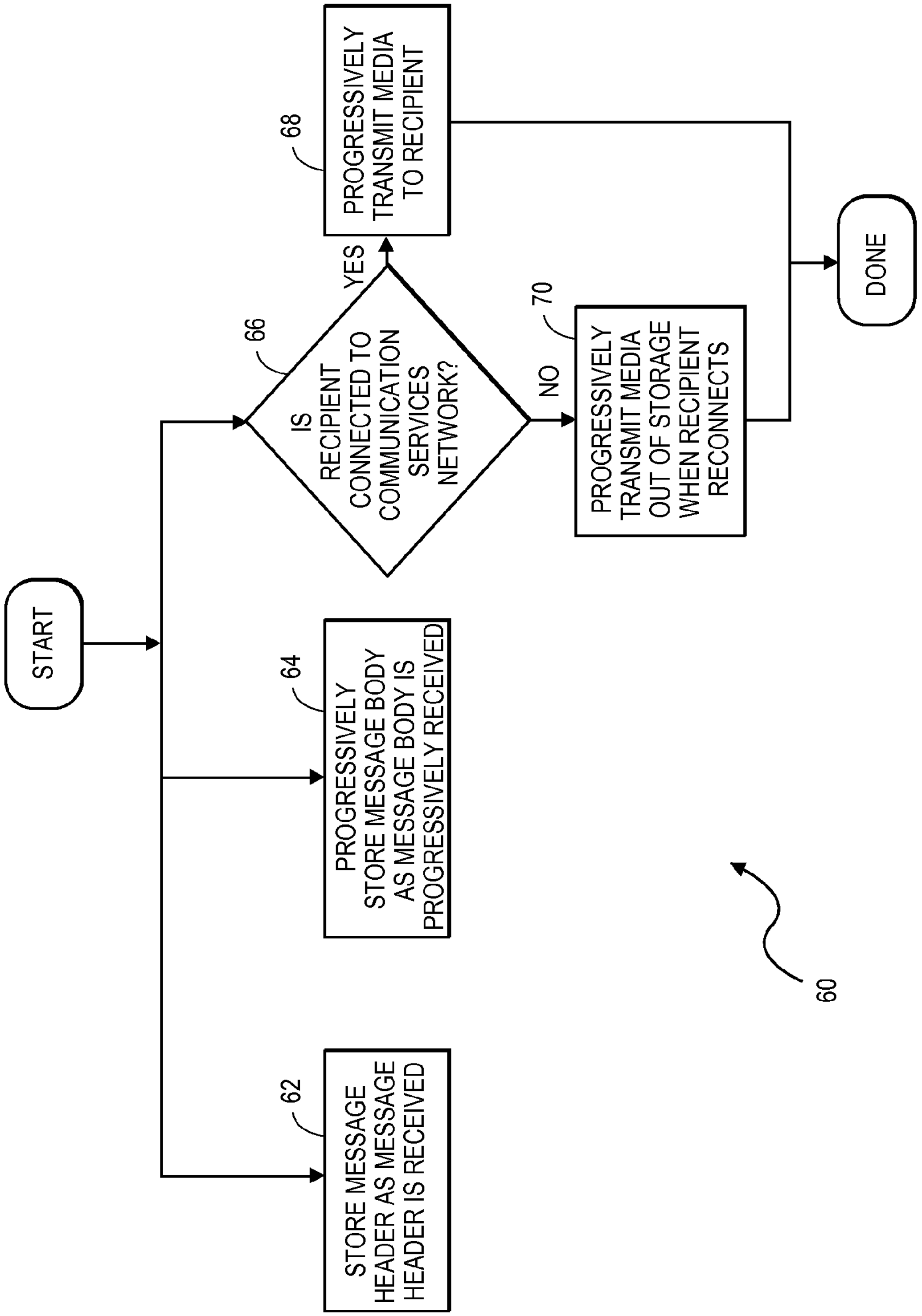
FIGS. 4A through 4C are flow charts illustrating non-exclusive embodiments of the operation of the communication services network in accordance with the principles of the present invention.

Referring to FIG. 4A, a flow diagram 60 illustrating the creation and delivery of a Vox message 52 between sending and receiving communication devices 16 and/or a gateway client 24 is illustrated. When the Vox message 52 is sent, the router 40 of the appropriate server cluster 14 stores (step 62) the header information of the Vox message in the appropriate header store 42 as the header of the HTTP message is received. The router 40 also progressively stores (step 44) the media of the Vox message 52 in the appropriate body store 44 as the media is progressively received. The router 40 also determines (decision 66), based on the presence status of the recipient, if the recipient is connected to the communication services network 12. If yes, then the media of the message is progressively transmitted (step 68) to the recipient as the media is received. If not, then the media of the message is progressively transmitted out of the body store 44 when the recipient later reconnects to the network (step 70). If the message is sent to multiple recipients, then the above process is repeated for each. It should be understood that the above steps ideally occur simultaneously to extend possible. As soon as the requisites conditions needed for each step is ready, the step is performed. In this manner, latency is reduced.

Figure 4B:
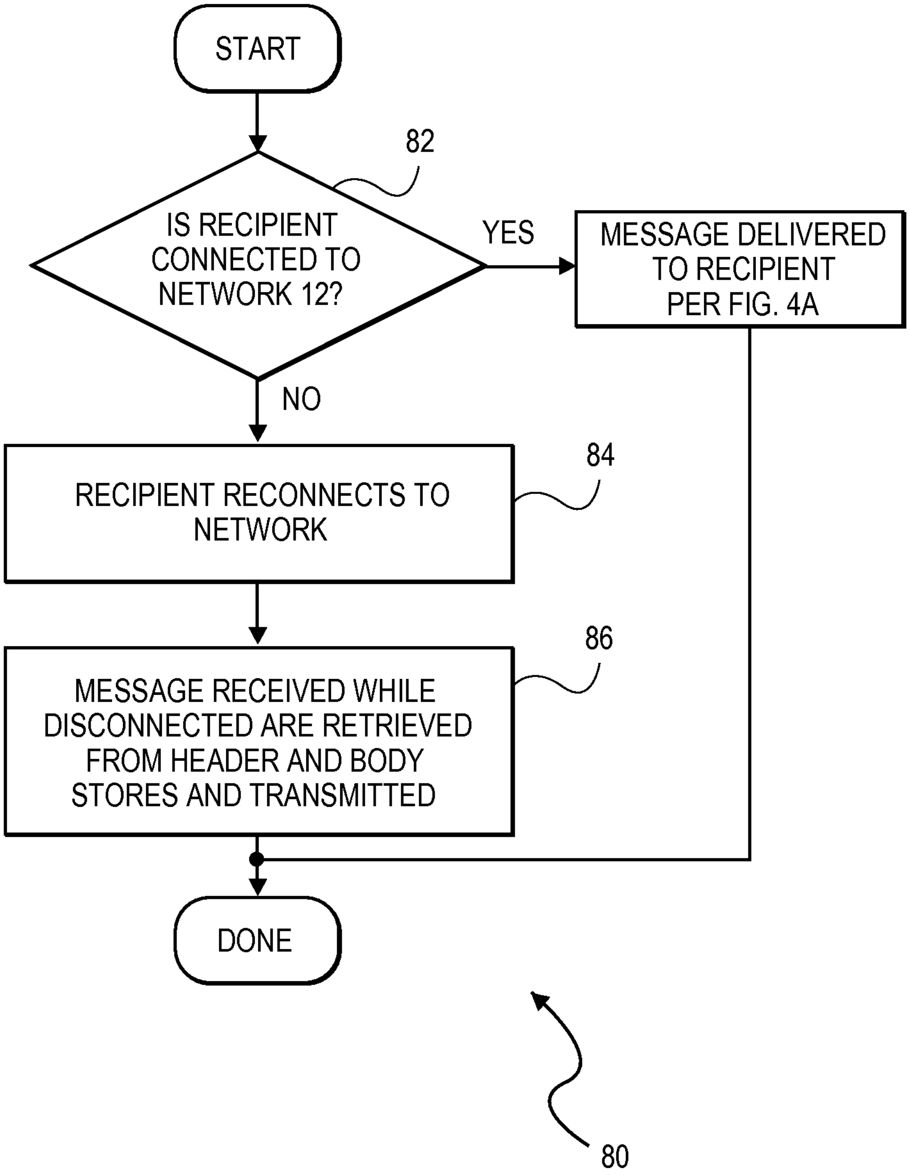

Referring to FIG. 4B, a flow diagram 80 illustrating how a recipient receives messages that were sent when disconnected from the communication services network 12 is shown. When a Vox message is transmitted over the network 12, the appropriate router 40 determines if the recipient is either connected or disconnected (decision 82) from the communication services network 12 based on the presence status information. If the recipient is connected, then the message is delivered as provided in the flow chart of FIG. 4A. On the other hand if the recipient is disconnected, then the Vox message header and body is stored in the appropriate header store 42 and body store 44. When the recipient reconnects to the network (step 84), the presence status is updated. In response, the Vox messages received while disconnected are retrieved from the header 42 and body 44 stores and progressively transmitted (step 86) to the recipient, which may be either a device 16 or a gateway client 24 on behalf of a legacy device 16.

Figure 4C:
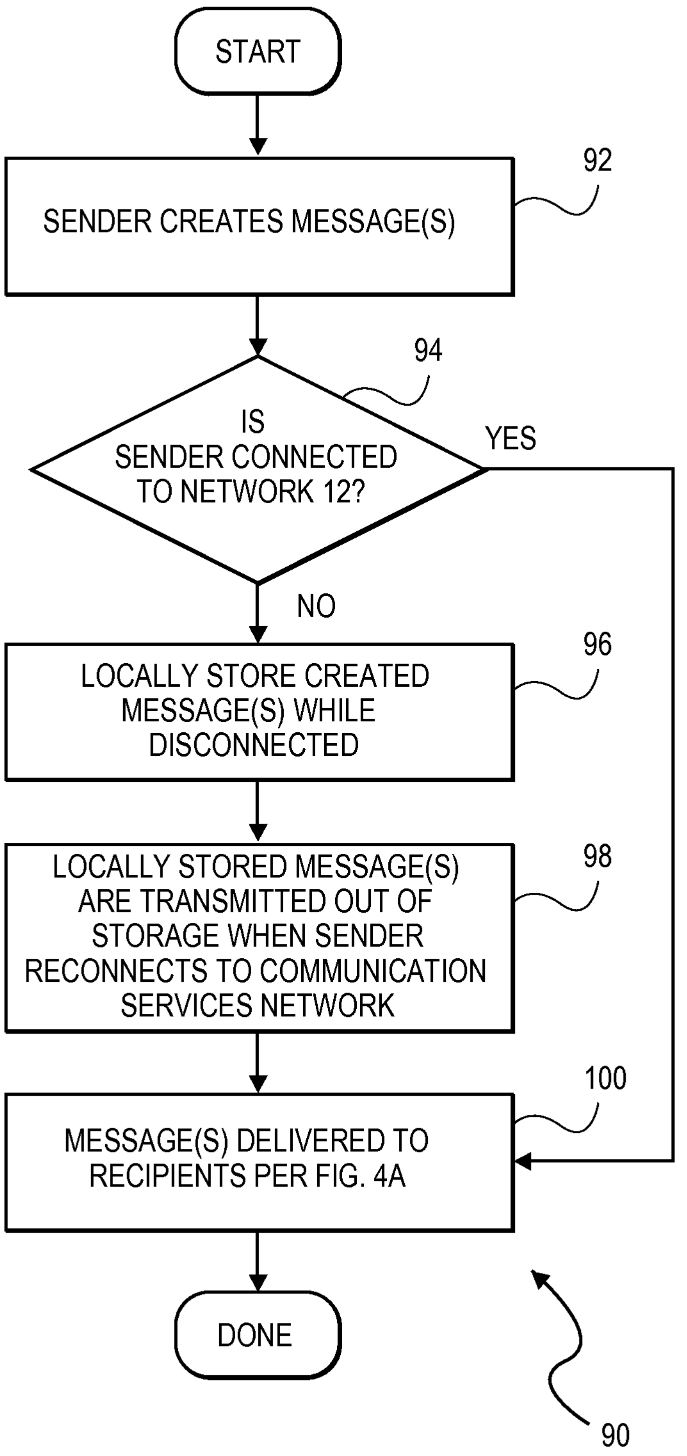

Referring to FIG. 4C, a flow diagram 90 illustrating the sequence for creating and transmitting messages from a client device 16 is illustrated. In the initial step 92, the user creates one or more Vox messages 52. As each message is created, the client application 20 determines (decision 94) if the device 16 is connected to the services network 12 or not. If yes, then the message is delivered to the recipient per the steps outlined with respect to FIG. 4A. On the other hand if disconnected, typically because either the network is down, or the sender has wondered into a location with no or limited coverage, then the created messages are locally stored (step 96) at the client communication device 16. When connectivity with the network 12 is reestablished, the one or more messages are transmitted (step 98) out of storage. The messages are then delivered (step 100) to the intended recipient(s) per the sequence detailed above with regard to FIG. 4A.

E. Scalability

The individual server clusters 14 on the communication services network 12 are preferably highly configurable and scalable. For example, if a large number of users subscribe to the services provided by the network 12, then additional server clusters 14 may be needed. If a particular server cluster 14 routes a high volume of traffic, but the Vox messages tend to be relatively short in duration (e.g., minimal media), then the number of header stores 42 in the particular server cluster 14 may be increased relative to the number of body stores 44. Alternatively, if the Vox messages handled by a particular server cluster 14 have large amounts of media, then more body stores 44 may be needed.

Figure 5A:
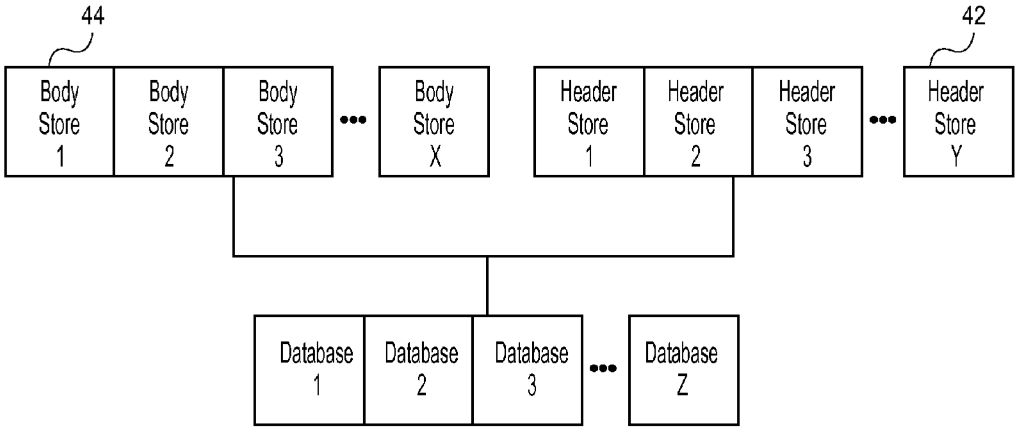
FIGS. 5A through 5C illustrate different embodiments of the communication services network in accordance with the principles of the present invention.

Referring to FIG. 5A, logical configuration of server cluster 14 is shown. With this configuration, the body store is treated as a single logical entity regardless of the number of actual body store nodes 44 (1 through X) that are added or removed from the cluster 14 and the header store is considered a single logical entity regardless of the number of header nodes 42 (1 through Y) that are added or deleted from the cluster 14. In alternative embodiments, the database used to store the body and header information may include any number of database nodes 1 though Z. In addition, the database, regardless of the number of nodes, may be treated as either (i) a single logical entity that is shared by the body and header store nodes or (ii) separate logical entities for the header store and the body store respectively.

In non-exclusive embodiments, the server clusters 14 are implemented using (i) any of a number of databases, such as but not limited to CouchDB, Riak, Apache Cassandra, HBase, or any other type of file system or relational database and (ii) a runtime environment such as Node.js or any other runtime environment that is scalable and interoperates with HTTP or other transport header protocols.

In yet other embodiments, sharding and replication mechanisms may be implemented for both the header and body stores for redundancy, failover and scaling purposes.

Figure 5B:
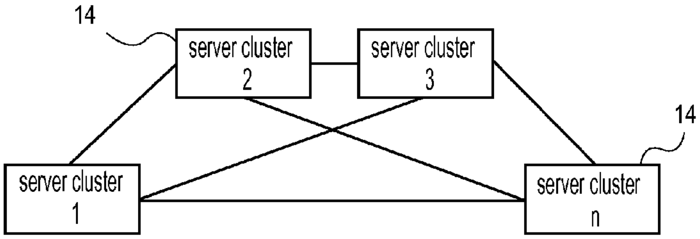

As illustrated in FIG. 5B, the number of server clusters 14 included in the network 12 may be added or deleted as needed. In this embodiment, the individual server clusters 14 are linked together in a full mesh. As additional server clusters 14 are needed, they are added to the mesh. A consistent hashing technique, based on user identifiers, is utilized to ensure the minimum reassignment of users to other server clusters 14 in the event of a failure of one server cluster 14, or when server clusters 14 are dynamically added to the mesh.

Figure 5C:
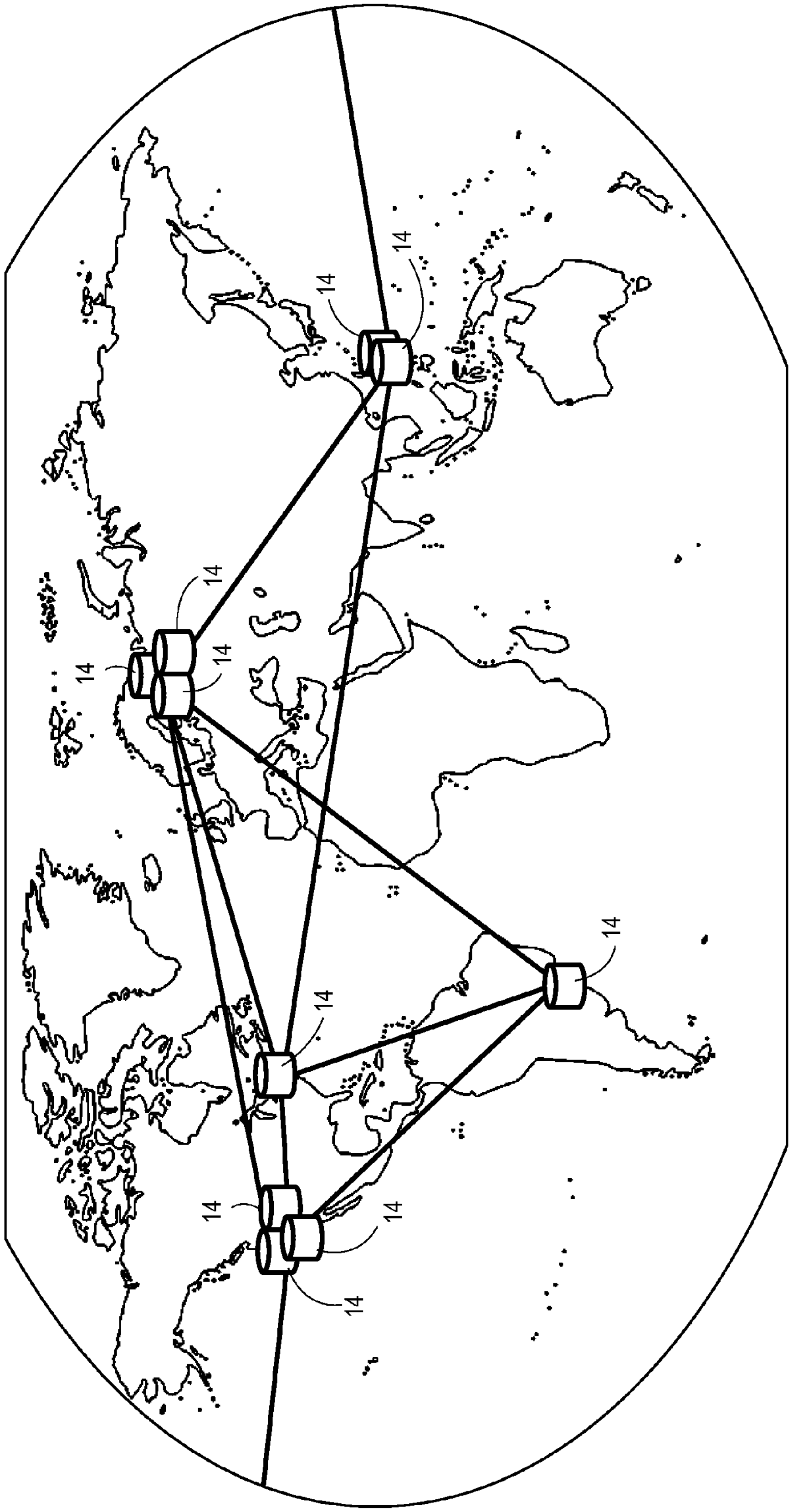

Referring to FIG. 5C, a plurality of server clusters 14 are shown at predetermined geographic locations. The individual servers clusters 14 are also connected in a full mesh. In this manner, a router 40 in one cluster 14 has access to and may read and/or write to the header stores 42 and body stores 44 in other server clusters 14.

As a general rule, the individual server clusters 14 are placed and configured as needed to meet local demands. Each server cluster 14 may be configured, sharded and scaled with as many routers 40, header stores 42 and body stores 44 as needed or practical. In addition, multiple server clusters 14 may be added at each geographic location as needed or practical. In this example, multiple server clusters are provided in Asia, Europe and on the west coast of North America It should be noted that the actual placement of the clusters 14 as illustrated is merely illustrative. The number and location of clusters 14, and the configuration of each, may vary depending on need and other factors.

Although many of the components and processes are described above in the singular for convenience, it will be appreciated by one of skill in the art that multiple components and repeated processes can also be used to practice the techniques of the system and method described herein. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and should not be restricted to the ones mentioned above. It is therefore intended that the invention be interpreted to include all variations and equivalents that fall within the true spirit and scope of the invention.

What is claimed is:

1. A communication node on a network, comprising:

a server configured to progressively receive media of a message sent to a recipient, the message having a message header and a message body containing the media, the server including:

a plurality of header stores, one of the plurality of header stores configured to store the message header;

a plurality of body stores, separate from the plurality of header stores, one of the plurality of body stores configured to progressively store the media of the message as the media contained in the message body is progressively received at the server; and one or more routers configured to progressively route the message to the recipient as the message is progressively received and stored, the one or more routers separately processing the message header and the message body by:

(i) discovering, as soon as the message header is received and stored in one of the plurality of header stores, at least a partial delivery route over the network to the recipient, without waiting, for the complete message body to be received, and stored in the one of the plurality of body stores; and (ii) progressively routing the media of the message to the recipient, over the at least partial delivery route, as the media of the message is progressively received, without waiting for the entire message body to be received, and stored in the one of the plurality of body stores.

2. The communication node of claim 1, wherein the one or more routers is/are further configured, to ascertain the at least partial delivery route to the recipient, based on information contained in the message header, as the media of the message contained in the message body is progressively received, at the server.

3. New The communication node of claim 1, wherein the one or more routers is/are further configured to ascertain a delivery route to the recipient from a lookup result of a unique identifier associated with the recipient and contained in the message header as the media of the message contained in the message body is progressively received at the server.

4. The communication node of claim 1, wherein the server further comprises an intra-server mesh coupling the plurality of header stores, the plurality of body stores, and the one or more routers within the server.

5. The communication node of claim 1, wherein the one or more routers is/are configured to perform read and/or write operations with the plurality of header stores and the plurality Of body stores respectively.

6. The communication node of claim 1, further comprising one or more additional servers, the one or more additional servers each including at least one header store, at least one body store separate from the at least one header store, and a router, wherein the server subscribes to information stored in the one or more additional servers respectively.

7. The communication node of claim 6, further comprising an inter-server mesh inter-connecting the server and the one or more additional servers over the network.

8. The communication node of claim 1, wherein the plurality of header stores are and the plurality of body stores are sharded.

9. The communication node of claim 1, wherein the message received, and routed by the server is :encapsulated using an encapsulation format, the encapsulation format comprises one of the following: JSON, XML, or msgpack.

10. The communication node of claim 1, wherein the server is further configured to receive and route the message using a transport header protocol, wherein the transport header protocol comprises one of the following: HTTP, SMTP, or SIP.

11. The communication node of claim 1, wherein the server is further configured to:

(i) progressively route the media contained in the body of the message as the media is progressively received if the recipient is connected to the network; and (ii) if the recipient is not connected to the network, transmit the media of the message from storage when the recipient reconnects to the network.

12. The communication node of claim 1, wherein the message is one of the following:

(i) a voice message containing voice media; or (ii) a video message containing video media.

13. The communication node of claim 1, further comprising configuring the server to be scalable by adding or removing as needed the number of:

(i) the plurality of header stores;

(ii) the plurality of body stores; and/or (iii) the one or more routers.

14. The communication node of claim 1, wherein the server is further configured to first receive the message header of the message followed by the message body.

15. A method of operating a communication network, comprising:

configuring a server on the communication network, the server including a plurality of header stores, a plurality of body stores separate from the plurality of header stores, and one or more routers;

progressively receiving at the server a message having a message header and a message body containing media, the message header received at the server ahead of the message body;

storing information contained in the message header in one of the plurality of header stores;

progressively storing the media contained in the message body in one of the plurality of body stores as the media is progressively received; and configuring the one or more routers to progressively route the message to recipient as the message is progressively received and stored by separately processing the message header and the message body by:

(i) discovering, as soon as the message header is received and stored in the one of the plurality of header stores, at least a partial delivery route over the network to the recipient, without waiting for the complete message body to he received and stored in the one of the plurality of body stores; and (ii) progressively routing the media of the message to the recipient, over the at least partial delivery mute, as the media of the message is progressively received, without waiting for the entire message body to be received and stored in the one of the plurality of body stores.

16. The method of claim 15, further comprising:

ascertaining at least a partial delivery route to the recipient based on the information contained in the message header as soon as the message header is received and stored in the one of the plurality of header stores; and progressively routing the media of the message to the recipient over the ascertained partial delivery route the media contained in the message body is progressively received and stored in the one of the plurality of body stores.

17. The method of claim 15, further comprising:

ascertaining if the recipient is connected to the network when the message is received at the server, and selectively:

(i) progressively routing the media of the message to the recipient as the media is progressively received and stored at the server if the recipient is connected to the network; and (ii) if the recipient is not connected to the network, transmitting the media of the message from storage when the recipient reconnects to the network.

18. The method of claim 15, further comprising scaling the server to vary the number of the plurality of header stores, the number of the plurality of body stores and the number of the one or more routers as needed respectively.

19. The method of claim 15, further comprising an intra-server mesh coupling the plurality of header stores, the plurality of body stores and the one or more routers within the server.

20. The method of claim 15, further configuring the one or more routers to perform read and/or write operations with the plurality of header stores and the plurality of body stores respectively.

21. The method of claim 15, further comprising sharding the plurality of header stores and the plurality of body stores respectively.

22. The method of claim 15, further configuring the server to receive and route the message encapsulated using an encapsulation format, the encapsulated format including one of the following: JSON, XML, or msgpack.

23. The method of claim 15, further configuring the server to receive and route the message using a transport header protocol, the transport header protocol comprising one of the following: HTTP, SMTP, or SIP.

24. The Method of claim 15, further comprising:

providing one or more additional Servers in the communication network, each of the One or more additional servers including at least one additional header store, at least one additional body store and at least one additional router respectively; and coupling the server and the one or more additional servers in an inter-server mesh over the network.

25. The method of claim 24, further configuring the server with the ability to access the at least one additional header store and the at least one additional body store of one or more additional servers over the network respectfully.

26. The method of claim 15, wherein the message is one of the following:

a voice message containing voice media;

a video message containing video media.

27. The method of claim 15, wherein progressively receiving the message at the server further comprises first receiving the message header of the message at the server followed by the message body.

* * * * *

UNITED STATES PATENT AND TRADEMARK OFFICE

CERTIFICATE OF CORRECTION

PATENT NO. : 8,924,593 B2
APPLICATION NO. : 13/084238
DATED : December 30, 2014
INVENTOR(S) : Matthew J. Ranney It is certified that error appears in the above-identified patent and that said Letters Patent is hereby corrected as shown below:

In the claims:

Line 17 of Claim 15, Col. 14, Line 54, change "to recipient" to -- to a recipient --.

Line 24 of Claim 15, Col. 14, Line 61, change "he" to -- be --.

Line 27 of Claim 15, Col. 14, Line 64, change "mute" to -- route --.

Line 3 of Claim 26, Col. 16, Line 26, insert -- or -- at the end of the line.

Signed and Sealed this
Eighth Day of September, 2015

Michelle K. Lee

Michelle K. Lee
*Director of the United States Patent and Trademark Office*